US007431905B2

(12) United States Patent
Hancu et al.

(10) Patent No.: US 7,431,905 B2
(45) Date of Patent: Oct. 7, 2008

(54) CATALYST SYSTEM AND METHOD FOR THE REDUCTION OF $NO_x$

(75) Inventors: Dan Hancu, Clifton Park, NY (US); Jonathan Lloyd Male, Kennewick, WA (US); Jennifer Kathleen Redline, Schenectady, NY (US); Stanlee Teresa Buddle, Gloversville, NY (US); Teresa Grocela Rocha, Clifton Park, NY (US); Alison Liana Palmatier, Porter Corners, NY (US); Benjamin Rue Wood, Niskayuna, NY (US); Job Thomas Rijssenbeek, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 297 days.

(21) Appl. No.: 11/242,655

(22) Filed: Oct. 4, 2005

(65) Prior Publication Data

US 2007/0092421 A1    Apr. 26, 2007

(51) Int. Cl.
*B01D 53/56* (2006.01)
*B01D 53/94* (2006.01)
*B01J 8/00* (2006.01)
*B01J 19/00* (2006.01)

(52) U.S. Cl. .............. 423/213.2; 423/213.5; 423/239.1; 422/168; 422/169; 422/170; 422/171; 422/177; 422/180

(58) Field of Classification Search .................. 422/168, 422/169, 170, 171, 177, 180; 423/213.2, 423/213.5, 239.1
See application file for complete search history.

(56) References Cited

U.S. PATENT DOCUMENTS

| 5,474,965 | A | * | 12/1995 | Nakatsuji et al. ............ 502/330 |
| 6,193,942 | B1 | * | 2/2001 | Okuda et al. ............. 423/213.2 |
| 6,284,211 | B1 | | 9/2001 | Miyadera et al. |
| 6,703,343 | B2 | | 3/2004 | Park |
| 2002/0094314 | A1 | | 7/2002 | Miyadera et al. |

FOREIGN PATENT DOCUMENTS

| DE | 19754627 | 12/1997 |
| EP | 0710499 | 5/1996 |
| EP | 0714693 | 6/1996 |
| EP | 0719580 | 7/1996 |
| EP | 0761289 | 3/1997 |
| JP | 1986011147 | 1/1986 |
| JP | 1996038854 | 2/1996 |

OTHER PUBLICATIONS

Miyadera, "Selective Reduction of $NO_x$ by Ethanol on Catalysts Composed of $Ag/Al_2O_3$ and $Cu/TiO_2$ Without Formation of By-Products", *Applied Catalysis B: Environmental*, vol. 16, pp. 155-164 (1998).
Kameoka et al., "Role Of Organic Nitro Compounds In Selective Reduction of $No_x$ With Ethanol Over Different Supported Silver Catalysts", *Catalysis Letters*, vol. 51, pp. 11-14 (1994).
Kameoka et al., "Reactivity of Surface Isocyanate Species With NO, $O_2$, And $NO+O_2$ In Selective Reduction Of $No_x$ Over $Ag/Al_2O_3$ And $Al_2O_3$ Catalysts", *Catalysis Letters*, vol. 55, pp. 211-215 (1998).
Eranen et al., "Continuous Reduction of NO With Octane Over A Silver/Alumina Catalyst In Oxygen-Rich Exhaust Gases: Heterogeneous And Surface-Mediated Homogeneous Reactions", *Journal of Catalysis*, vol. 219, pp. 25-40 (2003).
Kameoka et al., "Selective Catalytic Reduction Of $No_x$ With $CH_3OH$, $C_2H_5OH$ And $C_3H_6$ In The Presence Of $O_2$ Over $Ag/Al_2O_3$ Catalyst: Role of Surface Nitrate Species", *Physical Chemistry Chemical Physics*, vol. 2, pp. 367-372 (2000).
Warner et al., "Catalytic System And Method For The Reduction of NOx", U.S. Appl. No. 11/022,901, filed Dec. 22, 2004.
Warner et al., "Catalytic System and method for the reduction of NOx", U.S. Appl. No. 11/022,897, filed Dec. 22, 2004.

* cited by examiner

*Primary Examiner*—Timothy C Vanoy
(74) *Attorney, Agent, or Firm*—Eileen W. Gallagher

(57) ABSTRACT

A catalyst system for the reduction of NOx. is provided. The system comprises a catalyst in a first zone comprising a catalyst support, a catalytic metal comprising gallium, and at least one promoting metal selected from the group consisting of silver, gold, vanadium, zinc, tin, bismuth, cobalt, molybdenum, tungsten, indium and mixtures thereof; a catalyst in the second zone comprising a second catalyst support, a second catalytic metal selected from the group consisting of indium, copper, manganese, tungsten, molybdenum, titanium, vanadium, iron, cerium and mixtures thereof The catalyst system further comprises a gas stream comprising an organic reductant. The catalyst system may further comprise a catalyst in a third zone; the catalyst comprising a third catalyst support and a third catalytic metal selected from the group consisting of platinum, palladium, and mixtures thereof. A method for reducing NOx utilizing the catalyst system is also provided.

24 Claims, No Drawings

CATALYST SYSTEM AND METHOD FOR THE REDUCTION OF NO$_x$

BACKGROUND

This invention relates generally to a catalyst system and method for the reduction of nitrogen oxide emissions and more particularly to a catalyst system that comprises a multi-component catalyst and a reductant.

Methods have long been sought to reduce the deleterious effects of air pollution caused by byproducts resulting from imperfect high-temperature combustion of organic materials. When combustion occurs in the presence of excess air and at high temperatures, harmful byproducts, such as nitrogen oxides, commonly known as NO$_x$, are created. NO$_x$ and subsequent derivatives have been suggested to play a major role in the formation of ground-level ozone that is associated with asthma and other respiratory ailments. NO$_x$ also contributes to soot formation, which is linked to a number of serious health effects, as well as to acid rain and the deterioration of coastal estuaries. As a result, NO$_x$ emissions are subject to many regulatory provisions limiting the amount of NO$_x$ that may be present in effluent gas vented into the surrounding environment.

One known method for dealing with NO$_x$ involves the use of selective catalytic reduction (SCR) to reduce NO$_x$ to nitrogen gas (N$_2$) using ammonia (NH3) as a reductant. However, as ammonia's own hazardous consequences are well known, the use of NH3 in an SCR system presents additional environmental and other problems that must also be addressed. As regulatory agencies continue to drive limits on NO$_x$ emission lower, other regulations are also driving down the permissible levels of NH3 that may be emitted into the atmosphere. Because of regulatory limits on ammonia, the use of hydrocarbons and/or their oxygen derivatives for NO$_x$ reduction in an SCR process is very attractive. Numerous catalysts have been suggested for this purpose including zeolites, perovskites, and metals on metal oxide catalyst support. However, existing catalyst systems have either low activity or narrow region of working temperatures or low stability to water, which are detrimental to practical use. U.S. Pat. No. 6,703,343 teaches catalyst systems for use in NO$_x$ reduction. However, these catalyst systems require a specially synthesized metal oxide catalyst support with very low level of impurities. Other catalyst systems known to reduce NO$_x$ have exhibited very little control over the products formed from the reduction and in particular exhibit poor selectivity towards N$_2$ as product. Therefore there is a need for an effective catalyst system to reduce NO$_x$ emissions, which system is stable and operable at a wide range of temperatures.

BRIEF DESCRIPTION

In one embodiment, the invention provides a catalyst system for the reduction of NO$_x$ comprising (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium and mixtures thereof; (ii) a catalyst in a second zone following said first zone; said catalyst comprising a second catalyst support, and a second catalytic metal selected from the group consisting of indium, copper, manganese, tungsten, molybdenum, titanium, vanadium, iron, cerium and mixtures thereof; and (iii) a gas stream comprising NO$_x$ and an organic reductant comprising oxygen or nitrogen; wherein the catalysts in the first zone and second zone are substantially separated from each other.

In another embodiment, the invention provides a method for reducing NO$_x$, which comprises the steps of (a) providing a gas stream comprising NO$_x$ and an organic reductant comprising oxygen or nitrogen; and (b) contacting said gas stream with a catalyst system, wherein said catalyst system comprises (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium; indium and molybdenum; indium and cobalt; and indium and tungsten; and (ii) a catalyst in a second zone following said first zone; said catalyst comprising a second catalyst support, and a second catalytic metal selected from the group consisting of indium, copper, manganese, tungsten, molybdenum, titanium, vanadium, iron, cerium and mixtures thereof. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise.

In one embodiment the present invention comprises a catalyst system for the selective reduction of NO$_x$, which catalyst system comprises a catalyst in a first zone, a catalyst in a second zone following said first zone, and a reductant. The catalyst in the first zone comprises a first catalyst support, a first catalytic metal comprising gallium, and at least one promoting metal. The catalyst in the second zone comprises a second catalyst support, and a second catalytic metal. The reductant comprises an organic compound comprising oxygen or nitrogen. The catalyst system may also comprise an optional catalyst in a third zone following said second zone. The catalyst in the third zone may comprise a third catalyst support, and a third catalytic metal selected from the group of platinum, palladium, and mixtures thereof.

Catalyst supports may comprise alumina, titania, zirconia, ceria, silicon carbide or any mixture of these materials. Typically, the catalyst support comprises gamma-alumina with high surface area comprising impurities of at least about 0.2% by weight in one embodiment and at least about 0.3% by weight in another embodiment. The catalyst support may be made by any method known to those of skill in the art, such as co-precipitation, spray drying or sol-gel methods for example.

The catalyst in the first zone, sometimes hereinafter referred to as "Selective Reduction Catalyst" or "SRC" comprises gallium. In a particular embodiment the catalyst comprises from about 5 mole % to about 31 mole % of gallium, wherein mole percent is determined by dividing the number of moles of catalytic metal by the total number of moles of the metal components in the catalyst, including the catalyst support and any promoting metal present.

The catalyst in the first zone comprises at least one promoting metal. The promoting metal may be selected from the group consisting of silver, gold, vanadium, zinc, tin, bismuth, cobalt, molybdenum, tungsten, indium and mixtures thereof. The catalyst in the first zone typically comprises from about 1 mole % to about 22 mole % of the promoting metal, based on total moles of first catalytic metal, promoting metal, and first catalyst support. It should be appreciated that the term "promoting metal" is meant to encompass elemental metals, metal oxides or salts of the promoting metal, such as $Co_2O_3$ for example.

The catalyst in the second zone, sometimes hereinafter referred to as "RONO Destruct Catalyst" or "RDC", comprises a catalytic metal. In particular embodiments the catalytic metal is selected from the group consisting of indium, copper, manganese, tungsten, molybdenum, titanium, vanadium, iron, cerium and mixtures thereof.

The catalyst in the third zone, sometimes hereinafter referred to as "Deep Oxidation Catalyst" or "DOC", comprises a catalytic metal. In one embodiment, the catalytic metal is selected from the group consisting of platinum, palladium, and mixtures thereof. DOC may be prepared by techniques known to those skilled in the art. Alternately, they may be obtained from commercial sources.

The catalysts may be produced by methods known in the art. In one embodiment the catalysts may be produced by an incipient wetness technique, comprising the application of homogenous and premixed precursor solutions for catalytic metal and promoting metal contacted with the catalyst support. Precursor solutions for catalytic metal and promoting metal may be prepared separately or in a single solution. The catalyst support materials are typically calcined before application of the precursor solution. In some embodiments after application of precursor solution a primary drying step at about 80° C. to about 120° C. for about 1 hour to about 2 hours is followed by a post-calcination process. The post-calcination may be carried out at a temperature in the range of from about 500° C. to about 800° C. In some embodiments the post-calcination is carried out at a temperature in a range of from about 650° C. to about 750° C. In some embodiments the post-calcination is done for a time in a range of about 2 hours to about 10 hours. In some other embodiments the post-calcination is done for a time in a range of about 4 hours to about 8 hours. The particles are sifted to collect and use those which are from about 0.1 microns to about 3000 microns in diameter. In one embodiment the particle size ranges from about 400 microns to about 1000 microns in diameter. Based on the surface area and total pore volume of the catalyst support particles, the desired loading of the catalyst may then be calculated. As will be appreciated by those of ordinary skill in the art, the surface area and porosity may be lower, sometimes up to about 20-30% lower, in the final catalyst product as a result of catalyst loading. The theoretical loading capacity of the catalyst is determined by the total pore volume of the support, which determines the volume of metal precursors that can be loaded by incipient wetness. The precursor loading is chosen such that the amount of metal is typically less than a monolayer of the active metal on the catalyst support. In some embodiments twice the pore volume is used as the total volume of precursor to load, and the metal loading is taken in the range of from about 1 millimole to about 5 millimoles of the mixture of catalytic metal and promoting metal per gram of catalyst support.

Precursor solutions of the catalytic metal and one or more promoting metals may be prepared in aqueous media, in hydrophilic organic media, or in a mixture thereof. Hydrophilic organic media comprise carboxylic acids, alcohols and mixtures thereof such as, but not limited to, acetic acid or ethanol. The solutions are typically made by mixing solvent with metal salts, such as, but not limited to, metal nitrates, citrates, oxalates, acetylacetonates, molybdates, or benzoates, in an amount to create a solution of appropriate molarity based on the desired catalyst composition. In some embodiments the metal salt is a molybdenum heteropoly anion or ammonium molybdate. The methods used for preparing the catalyst system are known in the art and include depositing catalyst support in a honey-comb support in a wash coating method or extruding in a slurry into a desired form. The purity of the metal precursors for both catalytic metal and promoting metal is typically in the range of from about 95% to about 99.999% by weight. In one embodiment, all the metal precursors are mixed together and are as homogeneous as possible prior to addition to the catalyst support. In some other embodiments different metal precursors are added sequentially to the catalyst support. In one embodiment the desired volume of the precursor solution is added to coat the catalyst support and create a catalyst with the desired final catalyst loading. Once the metal salt solution or solutions have been added to the catalyst support, the catalyst may optionally be left to stand for a period of time, in some embodiments from about 6 hours to about 10 hours. The catalyst is then dried for a period of time at a desired temperature. In a particular embodiment the catalyst may be dried under a vacuum, optionally while a nitrogen stream is passed over the mixture. Finally, the catalyst may be calcined at a desired temperature and for a desired time to create the final catalyst product.

Catalysts according to exemplary embodiments of the present invention may be created using either a manual or an automated process. Typically, a manual process is used for the preparation of catalysts of a larger mass, such as about 1 gram (g) to about 20 g for example. An automated process is typically used when the catalysts are of a smaller mass, such as about 5 milligrams (mg) to about 100 mg, for example. Generally, manual and automated processes for preparation of catalysts are similar with the exception that an automated process involves automated measuring and dispensing of the precursor solutions to the catalyst support.

The SRC is present in a first zone while the RDC is present in a second zone. The first zone and the second zone are present in a specific spatial relationship to each other. In particular embodiments the second zone follows the first zone so that the gas stream comprising $NO_x$ comes into contact with the catalyst in the first zone before coming into contact with the catalyst in the second zone. In another embodiment the first and second zones are connected to each other. In still another embodiment the first zone and the second zone are spatially separated from each other. The distance between the two zones depends on the application in which the catalyst system is being used and may be readily determined by those skilled in the art. In another embodiment the catalysts in the first and second zones are in contact with one another at the interface between the two zones. In still another embodiment there may be some overlap between the catalysts in the first zone and the second zone at the interface between the two zones, but the order in which the gas stream comes into contact with the catalysts is still maintained. In particular embodiments the catalysts in the first zone and second zone are substantially separated from each other which means that the gas stream comprising $NO_x$ comes into contact with all of or at least greater than about 60 wt. % of catalyst in the first zone before coming into contact with any of catalyst in the second zone. The relative amounts of catalyst in the first and second zones may be readily optimized for reduction of $NO_x$ without undue experimentation depending upon the process in which the catalyst system is employed and other known factors.

The third zone, when present in the catalyst system, is present in a specific spatial relationship to the second zone. In particular embodiments the third zone follows the second zone so that the gas stream comes into contact with the catalyst in the second zone before the catalyst in the third zone. In another embodiment the second and third zones are connected to each other. In still another embodiment the second zone and the third zone are spatially separated from each other. The distance between the two zones depends on the application in which the catalyst system is being used in and may be readily determined by those skilled in the art. In another embodiment the catalysts in the second and third zones are in contact with one another at the interface between the two zones. In still other embodiments there may be overlap between the catalysts in the second zone and the third zone at the interface between the two zones but the order in which the gas stream comes into contact with the catalysts is still maintained. In particular embodiments the catalysts in the second zone and third zone are substantially separated from each other which means that the gas stream comprising $NO_x$ comes into contact with all of or at least greater than about 60 wt. % of catalyst in the second zone before coming into contact with any of catalyst in the third zone. The relative amounts of catalyst in the second and third zones may be readily optimized for reduction of $NO_x$ without undue experimentation depending upon the process in which the catalyst system is employed and other known factors.

The reductant for use in the catalyst system of exemplary embodiments of the present invention comprises an organic compound comprising oxygen or nitrogen or both. Said organic compounds are fluid, either as a liquid or gas, such that they may flow through the catalyst when introduced into an effluent gas stream for use in a catalyst system for the reduction of $NO_x$. Typically, hydrocarbons comprising oxygen or nitrogen and having less than about 16 carbon atoms will be fluid, although hydrocarbons comprising oxygen or nitrogen with higher numbers of carbon atoms may also be fluid, for example, depending on the chemical structure of the reductant and temperature of the gas stream. The organic compounds comprising oxygen or nitrogen suitable for use as reductants typically comprise at least one functional group selected from the group consisting of hydroxy, alkoxy, carbonyl, carbonate, amine, imine, nitrile and combinations thereof. In some embodiments the organic compounds comprising oxygen or nitrogen suitable for use as reductants comprise a member selected from the group consisting of an alcohol, an ether, an ester, a carboxylic acid, an aldehyde, a ketone, a carbonate, an amine, a nitrile, an imine and combinations thereof. Some non-limiting examples of organic compounds comprising oxygen or nitrogen suitable for use as reductants comprise methanol, ethyl alcohol, n-butyl alcohol, 2-butanol, tertiary butyl alcohol, n-propyl alcohol, isopropyl alcohol, dimethyl ether, dimethyl carbonate, acetonitrile, methylamine, dimethylamine, ethanolamine, or the like, or combinations thereof.

The catalyst system may be used in conjunction with any process or system in which it may be desirable to reduce $NO_x$ emissions, such as a gas turbine; a steam turbine; a boiler; a locomotive; or a transportation exhaust system, such as, but not limited to, a diesel exhaust system. The catalyst system may also be used in conjunction with systems involving generating gases from burning coal, burning volatile organic compounds (VOC), or in the burning of plastics; or in silica plants, or in nitric acid plants. The catalysts are typically placed at a location within an exhaust system where they will be exposed to effluent gas comprising $NO_x$. Each catalyst may be arranged as a packed or fluidized bed reactor, coated on a monolithic, foam, mesh or membrane structure, or arranged in any other manner within the exhaust system such that the catalyst is in contact with the effluent gas.

As will be appreciated by those ordinarily skilled in the art, although catalytic reactions are generally complex and involve many steps, the overall basic selective catalytic reduction reaction process for the reduction of $NO_x$ is believed to occur as follows:

$$NO_x + O_2 + \text{organic reductant} \rightarrow N_2 + CO_2 + H_2O \quad (1)$$

The effluent gas stream usually comprises air, water, CO, $CO_2$, $NO_x$, and may also comprise other impurities. Additionally, uncombusted or incompletely combusted fuel may also be present in the effluent gas stream. The organic reductant is typically fed into the effluent gas stream to form a gas mixture, which is then fed through the catalyst. Sufficient oxygen to support the $NO_x$ reduction reaction may already be present in the effluent gas stream. If the oxygen present in the gas mixture is not sufficient for the $NO_x$ reduction reaction, additional oxygen gas may also be introduced into the effluent gas stream in the form of oxygen, air, or a mixture of oxygen with at least one other gas. In some embodiments the gas stream comprises from about 1 mole % to about 21 mole % of oxygen gas, based on total moles components in the gas stream. In some other embodiments the gas stream comprises from about 1 mole % to about 15 mole % of oxygen gas, based on total moles components in the gas stream.

The catalyst system has two zones with an optional third zone. The first zone comprising the SRC may generally be used to convert $NO_x$ to nitrogen gas. During the conversion, intermediates are formed that may not be converted completely to nitrogen. The second zone comprising the RDC may be used to convert the intermediates into nitrogen. This ensures that there is sufficient conversion of $NO_x$ into nitrogen gas to meet the environmental standards. In a particular embodiment essentially 100% of $NO_x$ is converted to nitrogen. Other noxious gases such as CO may also result as a byproduct of the process. Alternately, CO may be part of the effluent gas stream that is fed into the catalyst. The DOC, when present, may be used to oxidize, for example, CO to the more benign $CO_2$ gas. Thus, the effluent gas stream comprising noxious gases may be converted into more benign gases that are acceptable to be released into the environment.

One advantage of embodiments of the present invention is that the reduction reaction may take place under "reductant lean" conditions. That is, the amount of reductant added to the effluent gas to reduce the $NO_x$ is generally low. Reducing the amount of reductant to convert the $NO_x$ to nitrogen may provide for a more efficient process that has decreased raw material costs. The molar ratio of reductant to $NO_x$ is typically in a range of from about 0.25:1 to about 6:1. In other embodiments the ratio is typically such that the ratio of carbon atoms in the reductant is in a range of from about 0.5 moles to about 24 moles per mole of $NO_x$. In some other embodiments the organic reductant and the $NO_x$ are present in a carbon:$NO_x$ molar ratio in a range of from about 0.5:1 to about 15:1. In a particular embodiment the organic reductant and the $NO_x$ are present in a carbon:$NO_x$ molar ratio in a range of from about 0.5:1 to about 8:1. Another advantage of embodiments of the present invention is that the $NO_x$ may be reduced selectively to form benign $N_2$ gas. This reduces the chances of releasing other noxious gases into the environment.

The reduction reaction may take place over a range of temperatures. Typically, the temperature may range in one embodiment from about 100° C. to about 800° C., in another embodiment from about 200° C. to about 700° C. and in still another embodiment from about 350° C. to about 650° C.

The reduction reaction may take place under conditions wherein the gas mixture is configured to have a space velocity suitable for the desired process configuration. In one embodiment the gas mixture is configured to have a space velocity in a range of from about 5000 reciprocal hours ($hr^{-1}$) to about 100000 $hr^{-1}$, in another embodiment in a range of from about 8000 $hr^{-1}$ to about 50000 $hr^{-1}$ and in still another embodiment in a range of from about 8000 $hr^{-1}$ to about 40000 $hr^{-1}$.

Exemplary embodiments of the catalyst system may also advantageously be used under wet conditions. In particular $NO_x$ reduction accomplished using exemplary embodiments of the present invention may be effective in effluent gas streams comprising water. In some embodiments the gas stream comprises from about 1 mole % to about 12 mole % of water and in some other embodiments from about 2 mole % to about 10 mole % of water, based on total moles components in the gas stream.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Preparation of the "Selective Reduction Catalyst" or "SRC" and "RONO Destruct Catalyst" (RDC): $Al_2O_3$ support (Saint-Gobain, NORPRO™) was initially calcined at 725° C. in air for 6 hours (hrs), and then sieved to obtain a fraction with average particle size between 450 microns to 1000 microns. It was then impregnated with an aqueous solution of $Ga(NO_3)_3 \cdot 6H_2O$ (Alpha Aesar, 99.999%), and $AgNO_3$ (Alpha Aesar, 99.995%). The impregnated support was then dried at 80° C. under vacuum, followed by post-calcination at 650° C. in air for 6 hrs. The temperature profile for the post-calcination was the following: (a) 1.1° C./minute ramp from 25° C. to 110° C., (b) soak at 110° C. for 1.5 hrs, (c) 5° C./min ramp from 110° C. to 650° C. (d) soak at 650° C. for 6 hrs. A similar procedure was followed to prepare RONO destruct catalysts, using one of the following metal precursors: $Cu(NO_3)_3 \cdot 5H_2O$, $In(NO_3)_3$, $Mn(CH_3COO)_2$, $(NH_4)_{10}W_{12}O_4$, or $Ce(NO_3)_3$.

Catalytic activities of the SRC+RDC catalysts were tested in a 32-tube reactor system. Gaseous feed was equally distributed into 32 tubes by a heated manifold connected to a system of 32 capillaries to assure equal flow through each tube. NO, $O_2$, $SO_2$ were delivered as mixtures in $N_2$. Liquid reductants such as EtOH or isopropanol (IPA) were delivered by bubbling $N_2$ through a pressurized bomb filled with the desired liquid. A typical gas composition of the feed was: 35 parts per million by volume (ppmv) $NO_x$, 12 vol. % $O_2$, 6-7 vol. % $H_2O$, 1 ppmv $SO_2$, 105 ppmv IPA or 157 ppmv ethanol (EtOH) (carbon:$NO_x$=9) Each of the 32 tubes was then charged with the SRC catalyst powder, followed by the RDC powder. The two catalysts were separated by quartz wool, such that the residence time between the 2 layers was equal to or longer than 4 milliseconds (ms). The total mass of the SRC plus the RDC powders was 50 milligrams (mg) in each tube. The gas flow rate in each tube was in a range of between 30-32 standard cubic centimeter per minute (sccm), to achieve GHSV (gas hourly space velocity) of about 16,000 reciprocal hours ($hr^{-1}$). Each tube was sequentially connected to a chemiluminescence analyzer via a system of multi-port valves. A Deep Oxidation Catalyst (DOC)(Pt/$Al_2O_3$-Johnson Matthey) was installed on the exit line between the multi-port valves and chemiluminescence detector. The role of the oxidation catalyst was to: (a) reduce the amount of CO/reductant slip, and (b) convert any N-containing compounds formed on the SRC+RDC catalyst package back to NO. Conversion of NO to $N_2$ was determined according to the following formula: $([NO_x]i+[NO_x]SRC+RDC+DOC)/[NO_x]i$, where $[NO_x]i$ is the $NO_x$ concentration in the initial feed, while $[NO_x]_{SRC+RDC+DOC}$ is the final $NO_x$ concentration downstream from the set of the three catalysts. The performance of various SRC–RDC–DOC catalyst systems in the presence of isopropyl alcohol is shown in Table 1, while Table 2 shows the performance of various SRC–RDC–DOC catalyst systems in the presence of ethanol. In both tables Ga and Ag were deposited by wetness impregnation on an $Al_2O_3$ support, followed by drying at 80° C., and post-calcination in air at 650° C. The $Al_2O_3$ support had been precalcined at 725° C. in air before impregnation, and had a surface area of 240 square meters per gram ($m^2/g$) and a pore volume of 0.8 cubic centimeters per gram ($cm^3/g$). In each table the mole % X equals $n_x/(n_{Al2O3}+n_x+n_y)$, where X, Y=Ga, Ag. In the tables the feed compositions were 35 ppm $NO_x$, 1 ppm $SO_2$, 7% $H_2O$, and 12% $O_2$, with 105 ppm IPA (carbon:$NO_x$=9) in Table 1 and 158 ppm EtOH (carbon:$NO_x$=9) in Table 2. For both tables the reaction conditions were temperature 400° C. as measured by a thermocouple located in the copper reaction block; space velocity (RDC+SRC) =16,000 $hr^{-1}$; and DOC temperature 550° C. as measured by a thermocouple located in the reaction block housing the DOC. The values for $NO_x$ to $N_2$ conversion ($X_{NOx\ to\ N2}$) were calculated using the equation $(([NO_x]_i-[NO_x]_{SRC+RDC+DOC})/[NO_x]_i) \times 100$. The abbreviation "C.Ex." means comparative example.

TABLE 1

Isopropanol reductant

| Ex. | SRC Catalyst | RDC | SRC:RDC (wt.) | $X_{NOx\ to\ N2}$ |
|---|---|---|---|---|
| C. Ex. 1 | 15% Ga—2% Ag | None | NA | 30 |
| 1 | 15% Ga—2% Ag | 3% Cu—3% Ce | 1.5 | 51 |
| 2 | 15% Ga—2% Ag | 3% Cu—3% Ce | 4 | 55 |
| 3 | 15% Ga—2% Ag | 3% Mn—3% Cu | 1.5 | 41 |
| 4 | 15% Ga—2% Ag | 3% Mn—3% Cu | 4 | 50 |
| 5 | 15% Ga—2% Ag | 3% Cu—3% W | 1.5 | 50 |
| 6 | 15% Ga—2% Ag | 3% Cu—3% W | 4 | 45 |

TABLE 2

Ethanol reductant

| Ex. | SRC Catalyst | RDC | SRC:RDC (wt.) | $X_{NOx\ to\ N2}$ |
|---|---|---|---|---|
| C. Ex. 2 | 15% Ga—2% Ag | None | NA | 40 |
| 7 | 15% Ga—2% Ag | 3% Cu—3% Ce | 4 | 52 |
| 8 | 15% Ga—2% Ag | 3% Mn—3% Cu | 4 | 65 |
| 9 | 15% Ga—2% Ag | 3% Mn—3% W | 1.5 | 55 |
| 10 | 15% Ga—2% Ag | 3% In—3% Ce | 4 | 53 |

Data in Table 1 show that the combination of the SRC species GaAg/$Al_2O_3$ with RCD species such as Cu—W/$Al_2O_3$, Mn—Cu/$Al_2O_3$, or Cu—Ce/$Al_2O_3$ brings about an increase in $NO_x$ to $N_2$ conversion, when compared to the SRC-only system.

Data in Table 2 list $NO_x$ to $N_2$ conversion over GaAg/$Al_2O_3$ SRC catalyst with or without the RDC species in the presence of EtOH. It shows that the combination of the Ga—Ag/$Al_2O_3$ with RDC species such as Cu—Mn/$Al_2O_3$, Mn—W/$Al_2O_3$, or In—Ce/$Al_2O_3$ brings about an increase in $NO_x$ to $N_2$ conversion, when compared to the SRC-only system. Also, comparison of the data in Tables 1 and 2 indicates that the composition of the RDC necessary for optimum selective reduction of $NO_x$ to $N_2$ depends on the type of reductant used in the process. Therefore, it is desired to optimize the composition of the RDC's as a function of the SRC and reductant used in the process, which process may be accomplished without undue experimentation.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A catalyst system for the reduction of NOx comprising:
    (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium and mixtures thereof;
    (ii) a catalyst in a second zone following said first zone; said catalyst comprising a second catalyst support, and a second catalytic metal selected from the group consisting of indium, copper, manganese, tungsten, molybdenum, titanium, vanadium, iron, cerium and mixtures thereof; and
    (iii) a gas stream comprising NOx and an organic reductant comprising oxygen or nitrogen;
    wherein the catalysts in the first zone and second zone are substantially separated from each other.

2. The catalyst system of claim 1, further comprising a catalyst in a third zone following said second zone; said catalyst comprising a third catalyst support and a third catalytic metal selected from the group consisting of platinum, palladium, and mixtures thereof; wherein the catalyst in the third zone is substantially separated from the catalyst in the second zone.

3. The catalyst system of claim 2, wherein said first catalyst support, said second catalyst support, and said third catalyst support independently comprise at least one member selected from the group consisting of alumina, titania, zirconia, ceria, silicon carbide and mixtures thereof.

4. The catalyst system of claim 1, wherein said first catalytic metal comprises gallium in a range of from about 5 mole % to about 31 mole %, based on total moles of first catalytic metal, promoting metal, and first catalyst support.

5. The catalyst system of claim 1, wherein said promoting metal is present in a range of from about 1 mole % to about 22 mole %, based on total moles of first catalytic metal, promoting metal, and first catalyst support.

6. The catalyst system of claim 1, wherein said organic reductant is selected from the group consisting of an alcohol, a hydroxy group, an alkoxy group, an ether, a carbonyl group, an ester, a carboxylic acid, an aldehyde, a ketone, a carbonate, an amine, a nitrile, an imine, and combinations thereof.

7. The catalyst system of claim 6, wherein said organic reductant is selected from the group consisting of methanol, ethyl alcohol, n-butyl alcohol, 2-butanol, tertiary butyl alcohol, n-propyl alcohol, isopropyl alcohol, dimethyl ether, dimethyl carbonate, acetonitrile, ethanolamine, propylene oxide, propylene glycol, methylamine, dimethylamine, and combinations thereof.

8. The catalyst system of claim 1, wherein said organic reductant and said $NO_x$ are present in a carbon: $NO_x$ molar ratio from about 0.5:1 to about 24:1.

9. The catalyst system of claim 1, wherein said gas stream further comprises water in a range of from about 1 mole % to about 12 mole %, based on total moles components in the gas stream.

10. The catalyst system of claim 1, wherein said gas stream further comprises oxygen gas in a range of from about 1 mole % to about 21 mole %, based on total moles components in the gas stream.

11. The catalyst system of claim 1, wherein $NO_x$ is present in effluent gas from a combustion source, said combustion source comprising at least one of a gas turbine, a steam turbine, a boiler, a locomotive, a transportation exhaust system, a diesel exhaust system, coal burning, plastics burning, volatile organic compound burning, a silica plant, or a nitric acid plant.

12. A catalyst system for the reduction of NOx comprising:
    (i) a catalyst in a first zone; said catalyst comprising a first catalyst support comprising alumina, a first catalytic metal comprising gallium present in an amount in the range of from about 5 mole % to about 31 mole %, based on total moles of first catalytic metal, promoting metal, and first catalyst support, and at least one promoting metal present in an amount in the range of from about 1 mole % to about 22 mole %, based on total moles of first catalytic metal, promoting metal, and first catalyst support, and selected from the group consisting of silver, gold, vanadium, zinc, tin, bismuth, cobalt, molybdenum, tungsten, indium, and combinations thereof;
    (ii) a catalyst in a second zone following said first zone; said catalyst comprising a second catalyst support comprising alumina, and a second catalytic metal selected from the group consisting of indium, copper, manganese, tungsten, molybdenum, titanium, vanadium, iron, cerium, copper and cerium, copper and manganese, copper and tungsten, manganese and tungsten, indium and cerium, and mixtures thereof;
    (iii) an optional third catalyst in a third zone following said second zone; said catalyst comprising a third catalyst support comprising alumina, and a catalytic metal selected from the group consisting of platinum, palladium, and mixtures thereof; and
    (iv) a gas stream comprising NOx and an organic reductant selected from the group consisting of methanol, ethyl alcohol, n-butyl alcohol, 2-butanol, tertiary butyl alcohol, n-propyl alcohol, isopropyl alcohol, dimethyl ether, dimethyl carbonate, acetonitrile, ethanolamine, propylene oxide, propylene glycol, methylamine, dimethylamine, and combinations thereof;
    wherein said organic reductant and said NOx are present in a carbon:NOx molar ratio from about 0.5:1 to about 24:1;
    wherein the first zone, the second zone and third zone are substantially separated from each other.

13. The catalyst system of claim 12, comprising the third catalyst in the third zone.

14. A method for reducing NOx, which comprises the steps of:
    (a) providing a gas stream comprising NOx and an organic reductant comprising oxygen or nitrogen; and
    (b) contacting said gas stream with a catalyst system, wherein said catalyst system comprises (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium, and combinations thereof, and (ii) a catalyst in a second zone following said first zone; said catalyst comprising a second catalyst support, and a second catalytic metal selected from the group consisting of indium, copper, manganese, tungsten, molybdenum, titanium, vanadium, iron, cerium and mixtures thereof.

15. The method of claim 14, wherein said contacting is at a temperature in a range of from about 100° C. to about 600° C.

16. The method of claim 14, wherein said contacting is performed at a space velocity in a range of from about 5000 hr-1 to about 100000 hr-1.

17. The method of claim 14, wherein said catalyst system further comprises a catalyst in a third zone following said second zone; said catalyst comprising a third catalyst support and a catalytic metal selected from the group consisting of platinum, palladium, and mixtures thereof.

18. The method of claim 17, wherein said first catalyst support, second catalyst support and third catalyst support independently comprise at least one member selected from the group consisting of alumina, titania, zirconia, ceria, silicon carbide and mixtures thereof.

19. The method of claim 14 wherein said first catalytic metal comprises gallium in the range of from about 5 mole % to about 31 mole %, based on total moles of first catalytic metal, promoting metal, and first catalyst support.

20. The method of claim 14 wherein said promoting metal is present in a range of from about 1 mole % to about 22 mole %, based on total moles of first catalytic metal, promoting metal, and first catalyst support.

21. The method of claim 14 wherein said organic reductant is selected from the group consisting of an alcohol, a hydroxy group, an alkoxy group, an ether, a carbonyl group, an ester, a carboxylic acid, an aldehyde, a ketone, a carbonate, an amine, a nitrile, an imine, and combinations thereof.

22. The method of claim 21, wherein said organic reductant is selected from the group consisting of methanol, ethyl alcohol, n-butyl alcohol, 2-butanol, tertiary butyl alcohol, n-propyl alcohol, isopropyl alcohol, dimethyl ether, dimethyl carbonate, acetonitrile, ethanolamine, propylene oxide, propylene glycol, methylamine, dimethylamine, and combinations thereof.

23. The method of claim 14 wherein said organic reductant and said NOx are present in a carbon:NOx molar ratio from about 0.5:1 to about 24:1.

24. The method of claim 14 wherein NOx is present in effluent gas from a combustion source, said combustion source comprising at least one of a gas turbine, a steam turbine, a boiler, a locomotive, a transportation exhaust system, a diesel exhaust system, coal burning, plastics burning, volatile organic compound burning, a silica plant, or a nitric acid plant.

* * * * *

UNITED STATES PATENT AND TRADEMARK OFFICE
CERTIFICATE OF CORRECTION

PATENT NO. : 7,431,905 B2
APPLICATION NO. : 11/242655
DATED : October 7, 2008
INVENTOR(S) : Hancu et al.

It is certified that error appears in the above-identified patent and that said Letters Patent is hereby corrected as shown below:

In Column 8, Line 3, delete "[NO$_x$]SRC+RDC+DOC)" and insert
-- [NO$_x$]$_{SRC+RDC+DOC}$) --, therefor.

In Column 11, Line 13, in Claim 16, delete "hr-1 to about 100000 hr-1" and insert
-- hr$^{-1}$ to about 100000 hr$^{-1}$ --, therefor.

Signed and Sealed this

Sixteenth Day of December, 2008

JON W. DUDAS
*Director of the United States Patent and Trademark Office*